United States Patent [19]
Malaval

[11] 3,840,432
[45] Oct. 8, 1974

[54] PULVERULENT ABSORBENT SAFETY ROD FOR A NUCLEAR REACTOR

[75] Inventor: Claude Malaval, Antony, France

[73] Assignee: Groupement Atomique Alsacienne Atlantique, Le Plessis Robinson, France

[22] Filed: June 4, 1973

[21] Appl. No.: 367,062

[30] Foreign Application Priority Data
June 2, 1972 France .......................... 72.19988

[52] U.S. Cl. .......................... 176/86 R, 176/36 R
[51] Int. Cl. .............................. G21c 7/16
[58] Field of Search .................... 176/22, 36, 86

[56] References Cited
UNITED STATES PATENTS

| | | | |
|---|---|---|---|
| 3,105,033 | 9/1963 | Camac | 176/22 |
| 3,136,701 | 6/1964 | Sidebottom et al. | 176/22 |
| 3,192,123 | 6/1965 | Costes et al. | 176/22 |

*Primary Examiner*—Harvey E. Behrend
*Attorney, Agent, or Firm*—Sughrue, Rothwell, Mion, Zinn and Macpeak

[57] ABSTRACT

A pulverulent absorbent safety rod for a nuclear reactor comprising a reservoir having three, superposed compartments. The lower compartment is situated in the core of the reactor and is filled with gas under pressure by way of a hollow, disconnectable rod. The intermediate compartment situated just above the core contains the absorbent and communicates with the lower compartment. The upper compartment situated in the reactor communicates with the intermediate compartment. When the hollow rod is disconnected, all the pulverulent absorbent falls into the lower compartment.

14 Claims, 3 Drawing Figures

PATENTED OCT 8 1974 3,840,432
SHEET 1 OF 2
FIG.1
FIG.2
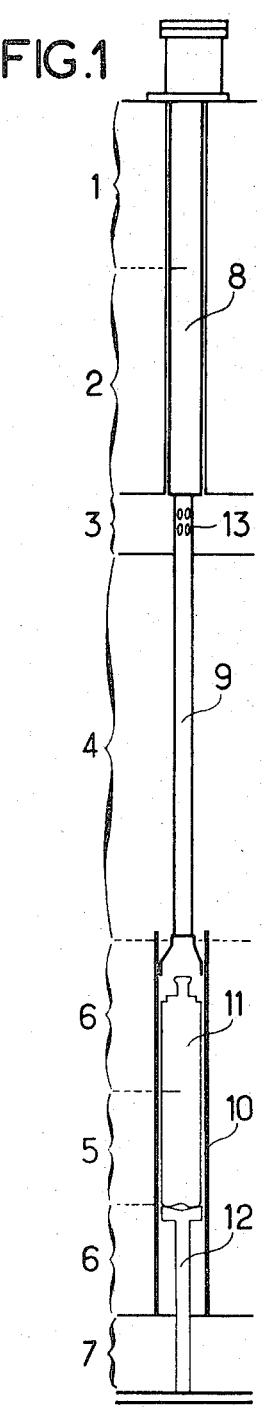
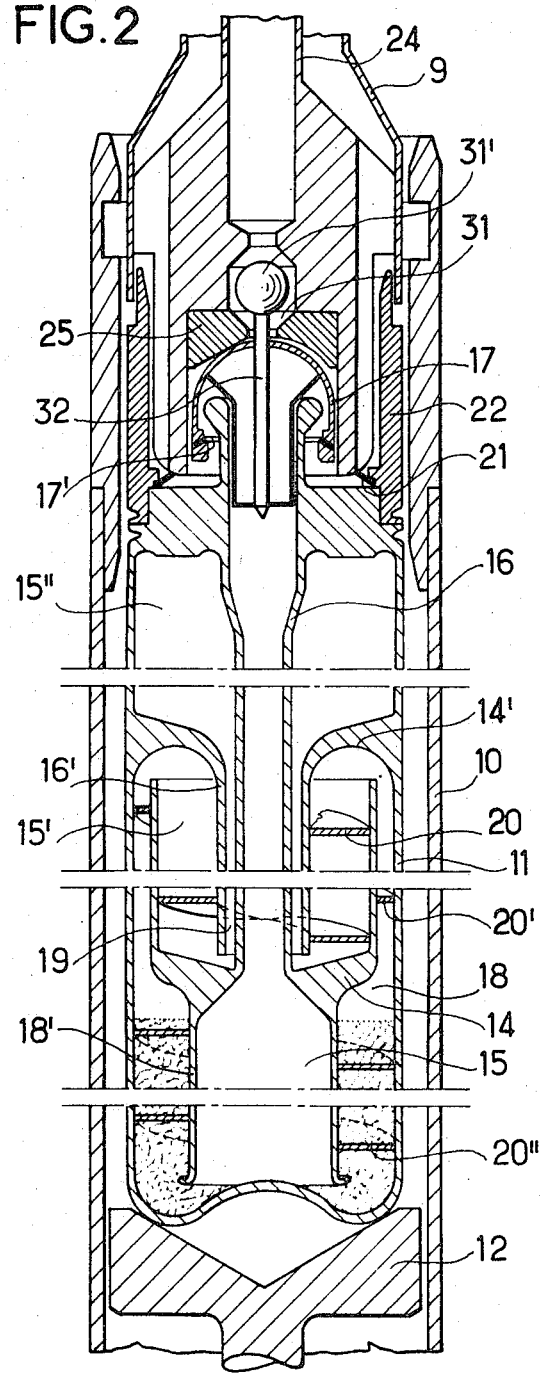

PULVERULENT ABSORBENT SAFETY ROD FOR A NUCLEAR REACTOR

BACKGROUND OF THE INVENTION

1. Field of the Invention

The present invention relates to a safety rod designed to lower the reactivity of a nuclear reactor by the rapid introduction of a pulverulent absorbent into a space located in the core of the reactor.

2. Prior Art

All conventional nuclear reactors are provided with solid absorbent rods which are introduced mechanically into the core of the reactor. However, the large number of mechanical parts constituting the operating mechanisms of these rods constitute a source of breakdowns and reduce the reliability of these devices.

Furthermore, these absorbent rods are at a serious disadvantage when there is an accident in the reactor and deformation of the core occurs. In fact, these rods run the risk of being blocked in their fall and can then only fulfil their function inadequately.

To obviate this latter disadvantage it has been proposed to utilize a liquid absorbent, which can be introduced into the core even in the event of a serious accident. However, the absorption properties of liquid absorbents are inferior to those of solid absorbents and, furthermore, the chemical properties of liquid absorbents sometimes lead to incompatibilities with the materials with which they are placed in contact.

SUMMARY OF THE INVENTION

The safety rod according to the present invention obviates these various disadvantages by pneumatically transporting a pulverulent absorbent between two superposed compartments located in the same reservoir. The lower compartment is situated in the core of the reactor and communicates with the space situated above the reservoir via a first vertical pipe having the same axis as the reservoir. The intermediate compartment is situated just above the core of the reactor. The upper part of the intermediate compartment communicates with the lower part of the lower compartment via an annular conduit externally limited by the inner wall of the reservoir and provided with at least one helicoidal fin. The upper compartment is situated in the reactor and communicates with the lower part of the intermediate compartment via an annular conduit situated between the first vertical pipe and a second vertical pipe acting as a support for a helicoidal fin situated in the intermediate compartment. The safety rod according to the invention further comprises means for pressurizing and depressurizing the lower compartment, permitting the displacement of the pulverulent absorbent between the intermediate compartment and the lower compartment and vice-versa.

The pulverulent absorbent is sent into the intermediate compartment by gas pressure and when the pressure in the three compartments has reached the same value, the gas may be discharged from the lower compartment to cause the pulverulent absorbent to be urged into this compartment by decompression of the gas contained in the upper compartment.

The reservoir may be rapidly repressurized to recommission the safety rod according to the invention.

According to an important feature of the invention, the means for pressurizing and depressurizing the lower compartment only comprise two gate valves, one two-way valve for the withdrawal movements of the pulverulent absorbent and a rapid opening valve for the rapid introduction of absorbent.

The circuits outside the reactor are thus only non-active non-dangerous, pneumatic circuits, which are not particularly large.

According to another feature of the invention, the reservoir is diametrically small in size and may be contained in a casing identical in size to those used for the fuel. This considerably facilitates handling operations.

According to another feature of the invention, the lower compartment in the reservoir is supplied with compressed gas via a hollow, disconnectable rod, the spherical end of which ensures seal-tightness in that it abuts against the top part of the reservoir which comprises the orifice of the vertical pipe communicating with the lower compartment.

When the hollow rod is disconnected, the gas escapes rapidly from the lower compartment and the pulverulent absorbent passes rapidly from the intermediate compartment to the lower compartment.

Other objects, features and advantages of the present invention will be made apparent from the following detailed description of the preferred embodiment thereof provided by way of a non-limitative example with reference to the accompanying drawings, in which:

BRIEF DESCRIPTION OF THE DRAWINGS

FIG. 1 is a diagrammatic, sectional view of a rapid nuclear reactor, in which is disposed a safety rod according to the invention, FIG. 2 is a vertical, sectional view of the part of the safety rod situated in the core of the reactor and in the extra-core space of the reactor.

DESCRIPTION OF THE PREFERRED EMBODIMENTS

Figure 3:
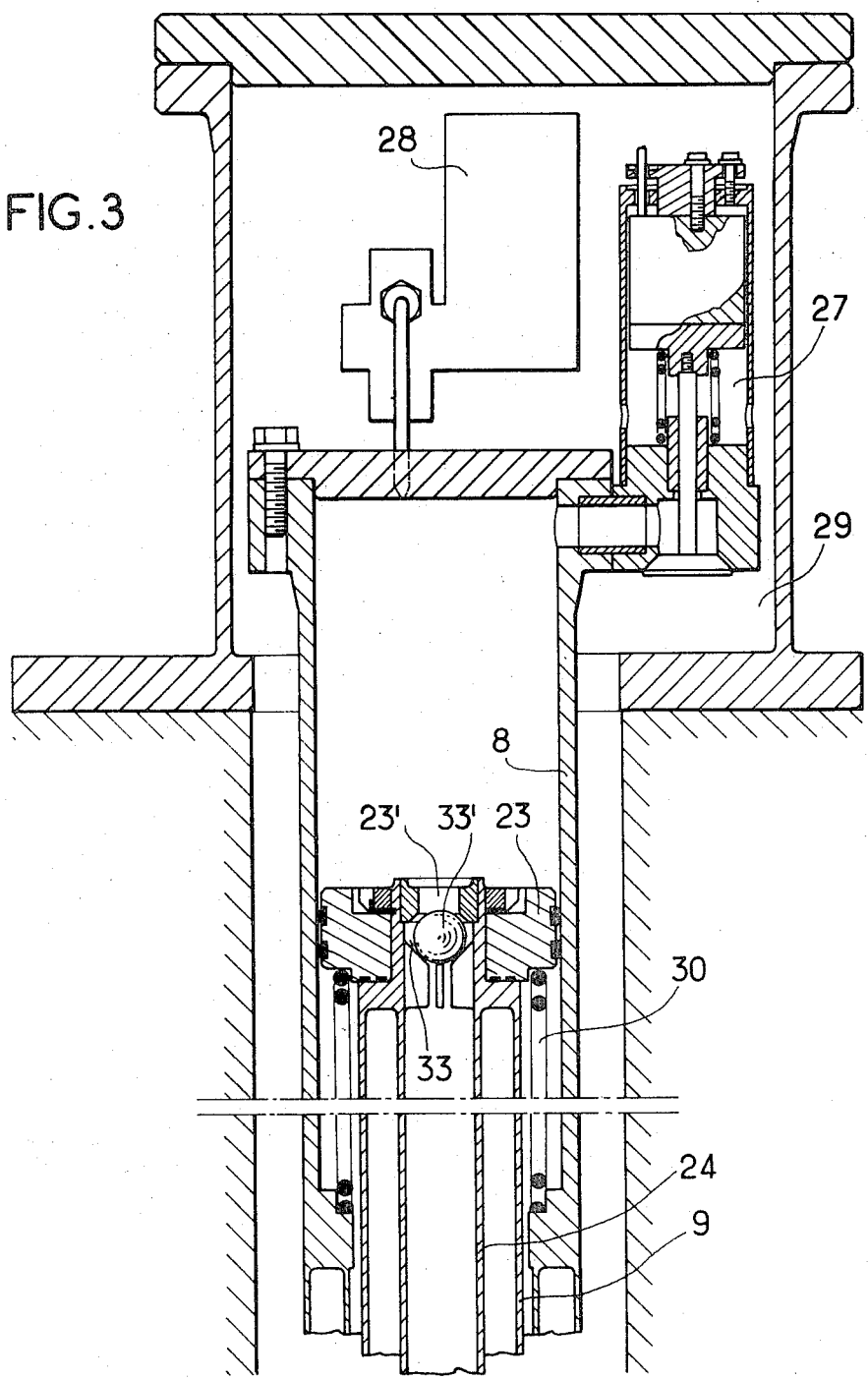
FIG. 3 shows the part of the safety rod according to the invention situated at the level of the reactor cover.

The rapid reactor represented in FIG. 1 comprises, from top to bottom, a cover 1 surmounting a protective plug 2, a gas layer (for example, argon or helium), a sodium layer 4, the core 5 containing the fuel surrounded by an extra-core space 6, and finally the support 7.

Each safety rod comprises a cylindrical body 8 extending from the top of the cover 1 to the bottom of the plug 2, a mobile shaft 9, the upper part of which slides into the cylindrical body 8, and the lower part of which is funnel-shaped and is situated below the limit between the extra-core space 6 and the sodium layer 4.

This lower part (see FIG. 2) is vertically mobile inside a casing 10, inside which is a reservoir 11 disposed on a pedestal 12 situated just below the core 5.

There are openings 13 in the shaft 9 at the level of the gas layer 3.

With reference to FIG. 2, which shows the part of the rod at the level of the extra-core space and the core, it will be noted that the reservoir 11 is situated in the casing 10 resting on the pedestal 12.

The reservoir 11 is cylindrical in shape and is divided in the axial direction by two partitions 14 and 14' into three compartments, a lower compartment 15, the height of which is equal to the core of the reactor, an intermediate compartment 15' and an upper compartment 15''. The reservoir is vertically disposed in the reactor so that the lower compartment 15 is situated in the core and the intermediate compartment 15' just above the core. The lower compartment 15 communicates with the outside via a vertical pipe 16 coaxial to the reservoir and opening at the top of the reservoir 11. The pipe 16 comprises at its upper part a vertically displaceable bell 17 provided with a dish-shaped sealing joint 17' capable of sealing the pipe 16 in the raised position.

The intermediate compartment 15' communicates with the lower compartment 15 via an annular conduit 18 lying between the inner wall of the reservoir 11 and a cylindrical wall 18', going from the upper part of the intermediate compartment 15' to the lower part of the lower compartment. The annular conduit 18 is small in section above the partition 14 and its section increases below this partition.

The upper compartment 15'' communicates with the intermediate compartment via an annular conduit 19 lying between the pipe 16 and another pipe 16' enclosing the pipe 16 and running from the partition 14' to end in the region of the partition 14.

A helicoidal fin 20 is disposed between the pipe 16' and the wall 18' in the intermediate compartment 15'.

A second helicoidal fin 20' is provided in the narrow section of the conduit 18 between the wall of the reservoir 11 and the wall 18', and a third helicoidal fin 20'' is provided in the wider section of this conduit 18.

The upper part of the reservoir 11 is provided with a conical dish-shaped, sealing part 21 held in place by a cylindrical part 22.

FIG. 3, which represents the part of the safety rod situated at the level of the cover and of the protective plug of the reactor, shows the cylindrical body 8 lodged in holes provided in the protective plug.

A piston 23 integral with the shaft 9 and a hollow rod 24 situated inside the shaft 9 and having the same axis, is displaced inside the cylindrical body 8. The piston 23 comprises in its center an orifice 23' permitting communication between the upper part of the cylindrical body 8 and the hollow rod 24.

The lower end 25 (see FIG. 2) of the rod 24 is spherical in shape and bears fins 26 rendering it integral with the shaft 9. In a lowered position, this end 25 comes to rest against the dish seal 21 of the reservoir 11 while the lower part of the shaft 9 surrounds the upper part of the cylindrical part 22.

The top part of the cylindrical body 8 comprises a heavy-duty rapid opening electro-valve 27 and a two-way valve 28. The exhausting of these two valves takes place in the container 29, which communicates with the space containing the cover gas 3 by way of an annular space surrounding the cylindrical body (see FIG. 1).

In the rest position, the piston 23 and the hollow rod 24 and the shaft 9 are kept in the upper position by a spring 30 by reason of the lack of pressure in the cylindrical body 8.

The hollow rod 24 bears a ball valve 31 at its lower end (see FIG. 2) which allows the passage of gas in the raised position of the ball 31'. This valve allows the pressure to be maintained, to obtain displacement of the piston, up to the moment of the connection with the reservoir 11. A few millimeters before this connection is made, the ball 31' of the valve 31 is raised by a vertical teat 32 extending beyond the bell 17.

Another ball valve 33 is located at the upper part of the hollow rod 24 and seals the orifice 23' of the piston 23 when the ball 33' of the valve 33 is in the raised position. The role of the valve 33 is to prevent the relaxation of the gas contained in the space between the two valves. In fact, the volume of this space is much greater than the volume of the cylindrical body 8 situated above the piston 23. The relaxation of the gas contained in the space between the two valves would considerably increase the operating time of the safety rod.

The safety rod according to the invention operates as follows:

When the reservoir 11 is in position on the pedestal 12 and the pulverulent absorbent, for example, boron carbide, is in the wide part of the conduit 18, the space within the cylindrical body 8 situated above the piston 23, is pressurized by way of the two-way electro-valve 28. The ball valve 31 closes and the piston 23 descends. As soon as the lower end 25 of the hollow rod 24 arrives near the top of the reservoir, the teat 32 of the bell 17 opens the ball valve 31 so that the liquid sodium is driven by the gas under pressure issuing from the valve 31. The bell 17 is pushed downwards by the end 25 of the hollow rod 24 until the edges of this end come to rest against the dish seal 21. The gas under pressure then penetrates the lower compartment 15' of the reservoir 11.

The boron carbide powder is sent from the part of the annular conduit 18 having a wider section towards the intermediate compartment 15'. In fact, the gas rushes below the fin 20'' across the powder, fluidizes the latter and draws it along the fin 20' until it reaches the intermediate compartment 15'. The helicoidal fin 20 in this compartment guides the fluidized powder and the centrifuging resulting from the movement allows the powder to be stacked in successive, concentric layers on the fin 20.

The gas then escapes via the conduit 19 and pressurizes the upper compartment 15''.

Gas continues to be injected into the reservoir until the pressure obtained is appreciably greater than the pressure prevailing in the core of the reactor. At this point, the injection of gas is ceased by putting the electro-valve 28 into the closed position.

When the rapid electro-valve 27 is opened, the pressure in the cylindrical body 8 is cancelled out and the ball valve 33 closes. The combined action of the spring 30 and the undertow effect on the spherical end 25 of the hollow rod 24 causes the piston 23 and the hollow rod 24 to rise, while the ball valve 31 closes, imprisoning the gas contained between the two valves in the hollow rod 24.

The gas escapes from the lower compartment 15 bringing about rapid depressurization of this lower compartment so that the gas under pressure from the upper and intermediate compartments rushes along the fin 20, fluidizes the powder and draws it into the annular conduit 18. The powder is then deposited on the fin 20'' and on the bottom of the lower compartment 15, as shown in FIG. 2.

The gas escapes from the lower compartment 15, passes between the spherical end 25 and the conical dish 21 and rises at the surface of the sodium contained in the annular conduit situated between the rod 24 and the shaft 9. This gas then passes across the holes 13 of the shaft 9 into the space 3 containing the covering gas.

The pulverulent absorbent passes rapidly from the intermediate compartment 15' to the lower compartment 15 as soon as the seal tightness is broken at the level of the conical dish 21.

Under the effect of the gas pressure still prevailing in the lower compartment 15, the bell 17 adopts a raised position and the seal joint 17' is applied against the end of the vertical pipe 16 preventing the sodium from re-entering the reservoir 11.

The reactivity of the reactor can be sharply reduced by the rapid introduction of the liquid absorbent into the core of the reactor.

The operating cycle can be recommenced and the safety rod brought back into commission by passing back the pulverulent absorbent from the annular conduit of the lower compartment to the intermediate compartment.

The safety rod according to the invention is not limited to use in rapid reactors and it may be used in rapid or slow reactors to rapidly reduce the reactivity of these reactors.

Although the safety rod described is more advantageous when used in the embodiment according to the invention, it can obviously be modified in various ways without departing from the scope of the invention and certain elements contained therein can be replaced by others capable of ensuring the same technical function or an equivalent technical function.

What is claimed is:

1. A pulverulent absorbent safety rod for a nuclear reactor, comprising: a vertical, cylindrical reservoir divided into three, superposed compartments, the lower compartment being situated in the core of the reactor and communicating with the space above the reservoir via a first vertical pipe coaxial with the reservoir, the intermediate compartment being situated just above the core of the reactor, means communicating the upper part of this intermediate compartment with the lower part of the lower compartment via an annular conduit limited externally by the inner wall of the reservoir and being provided with at least one helicoidal fin, the upper compartment being situated in the reactor and communicating with the lower part of the intermediate compartment via an annular conduit situated between the first vertical pipe and a second vertical pipe acting as the support for a helicoidal fin located in the intermediate compartment, said safety rod further comprising means for pressurizing and depressurizing the lower compartment to enable the pulverulent absorbent to be displaced between the intermediate compartment and the lower compartment and vice versa.

2. A pulverulent absorbent safety bar according to claim 1, wherein: the pressurization and depressurization means comprise at least one valve means discharging into a cylindrical body, a piston slidably disposed in said body, said piston being provided with a central orifice opening into a hollow rod integral with the piston, and the upper end of said hollow rod being semi-spherical in shape and engaging in a lowered position with a junction element situated at the top of a vertical pipe extending through the upper compartment of the reservoir to connect the lower compartment with the outside.

3. A pulverulent absorbent safety rod according to claim 2, wherein the top of the reservoir is provided with a sealing dish against which the periphery of the semi-spherical end of the hollow rod abuts.

4. A pulverulent absorbent safety rod according to claim 1, wherein: the pressurization and depressurization means further comprises a two-way valve for conveying the pulverulent absorbent towards the intermediate compartment and a rapid opening valve for the rapid introduction of pulverulent absorbent into the lower compartment.

5. A pulverulent absorbent safety rod according to claim 2, wherein: the junction element with the vertical pipe connecting the lower compartment with the outside is a bell having the same axis as said pipe and being movable along said axis, and the edge of said bell being provided with a dish-shaped sealing joint, which in the raised position of the bell, abuts against the periphery of the top of the pipe.

6. A pulverulent absorbent safety rod according to claim 5, wherein: the hollow rod is enclosed by a hollow shaft having the same axis and also being integral with the piston and acting as a guide for the gas escaping from the lower compartment of the reservoir to the space containing the reactor covering gas.

7. A pulverulent absorbent safety device according to claim 6, wherein: the lower end of the hollow rod is provided with a ball valve which allows the passage of the gas when the ball is in a raised position.

8. A pulverulent absorbent safety rod according to claim 5, wherein: the bell is provided with a vertical teat for raising the ball of said valve in the lowered position of the piston.

9. A pulverulent absorbent safety rod according to claim 2, wherein: the central orifice of the piston is provided with a ball valve allowing the passage of the gas in the lowered position of the ball thereof.

10. A pulverulent absorbent safety rod according to claim 1, wherein: the absorbent is boron carbide.

11. A pulverulent absorbent safety rod according to claim 1, wherein: the reservoir is disposed in a casing identical to those used for the fuel of the reactor.

12. A pulverulent absorbent safety rod according to claim 2, wherein the pressurization and depressurization means further comprises a two-way valve for conveying the pulverulent absorbent towards the intermediate compartment and a rapid opening valve for the rapid introduction of pulverulent absorbent into the lower compartment.

13. A pulverulent absorbent safety rod according to claim 3, wherein the pressurization and depressurization means further comprises a two-way valve for conveying the pulverulent absorbent towards the intermediate compartment and a rapid opening valve for the rapid introduction of pulverulent absorbent into the lower compartment.

14. A pulverulent absorbent safety rod according to claim 7, wherein: the bell is provided with a vertical teat for raising the ball of said valve in the lowered position of the piston.

* * * * *